(12) United States Patent
Franze et al.

(10) Patent No.: US 10,889,255 B2
(45) Date of Patent: Jan. 12, 2021

(54) ELECTRICAL ENERGY MANAGEMENT OF A VEHICLE SYSTEM OF A MOTOR VEHICLE

(71) Applicants: Bayerische Motoren Werke Aktiengesellschaft, Munich (DE); Mentor Graphics Corporation, Wilsonville, OR (US)

(72) Inventors: Daniel Franze, Neuss (DE); Carsten Schmid, Bad Duerrheim (DE); Georg Spoerlein, Schopfloch (DE); Reiner Striebel, Reichenau (DE)

(73) Assignees: Bayerische Motoren Werke Aktiengesellschaft, Munich (DE); Mentor Graphics Corporation, Wilsonville, OR (US)

( * ) Notice: Subject to any disclaimer, the term of this patent is extended or adjusted under 35 U.S.C. 154(b) by 3 days.

(21) Appl. No.: 16/472,331

(22) PCT Filed: Dec. 20, 2017

(86) PCT No.: PCT/DE2017/000431
§ 371 (c)(1),
(2) Date: Jun. 21, 2019

(87) PCT Pub. No.: WO2018/113813
PCT Pub. Date: Jun. 28, 2018

(65) Prior Publication Data
US 2019/0377397 A1 Dec. 12, 2019

(30) Foreign Application Priority Data
Dec. 23, 2016 (DE) .................. 10 2016 015 512

(51) Int. Cl.
*B60R 16/03* (2006.01)
*G06F 1/30* (2006.01)
(Continued)

(52) U.S. Cl.
CPC ................ *B60R 16/03* (2013.01); *G06F 1/30* (2013.01); *G06F 1/32* (2013.01); *G06F 9/4418* (2013.01)

(58) Field of Classification Search
CPC ... B60R 16/03; G06F 1/30; G06F 1/32; G06F 9/4418
(Continued)

(56) References Cited

U.S. PATENT DOCUMENTS 5,375,247 A 12/1994 Hueser
5,659,762 A * 8/1997 Sawada ................. G06F 1/1616
713/323

(Continued)

FOREIGN PATENT DOCUMENTS

DE 88 17 191 U1 12/1993
DE 10 2009 041 006 A1 3/2011
(Continued)

OTHER PUBLICATIONS

International Search Report (PCT/ISA/210) issued in PCT Application No. PCT/DE2017/000431 dated Apr. 30, 2018 with English translation (seven (7) pages).
(Continued)

*Primary Examiner* — William Hernandez
(74) *Attorney, Agent, or Firm* — Crowell & Moring LLP

(57) ABSTRACT

A device for electrical energy management of a vehicle system of a motor vehicle includes a power supply for supplying energy to the vehicle system of the motor vehicle. The power supply has a normal operation mode and a stand-by operation mode. A distributing device has voltage levels on the output side for supplying electrical energy to vehicle system components of the vehicle system. A state-monitoring device monitors the electrical energy supply of the power supply and controls the distributing device. A
(Continued)

computer device has an operating system device and a volatile computer data memory that is designed to be kept energized even in the stand-by operation mode of the device for energy management, in such a way that the volatile computer data memory does not lose the data stored therein. A method and a motor vehicle corresponding to the device are also provided.

19 Claims, 6 Drawing Sheets

(51) Int. Cl.
  *G06F 1/32* (2019.01)
  *G06F 9/4401* (2018.01)

(58) Field of Classification Search
  USPC .......................................... 307/9.1, 10.1, 10.6
  See application file for complete search history.

(56) References Cited

U.S. PATENT DOCUMENTS

| | | | |
|---|---|---|---|
| 6,243,630 B1 | 6/2001 | Oohara et al. | |
| 6,243,831 B1* | 6/2001 | Mustafa | G06F 1/30 |
| | | | 713/324 |
| 6,601,176 B1* | 7/2003 | Alexander | G06F 1/24 |
| | | | 713/1 |
| 9,424,047 B2* | 8/2016 | Hall | G06F 9/4401 |
| 2006/0242458 A1 | 10/2006 | Feldman et al. | |
| 2008/0155209 A1 | 6/2008 | Tsubouchi | |
| 2013/0154354 A1 | 6/2013 | Hayashi | |
| 2015/0039877 A1 | 2/2015 | Hall et al. | |
| 2015/0082011 A1 | 3/2015 | Mellinger et al. | |
| 2017/0313268 A1 | 11/2017 | Dalke | |

FOREIGN PATENT DOCUMENTS

| | | |
|---|---|---|
| DE | 10 2014 215 410 A1 | 2/2015 |
| DE | 10 2014 019 435 A1 | 6/2016 |
| DE | 10 2014 224 485 A1 | 6/2016 |
| EP | 0 376 510 A2 | 7/1990 |

OTHER PUBLICATIONS

German-language Written Opinion (PCT/ISA/237) issued in PCT Application No. PCT/DE2017/000431 dated Apr. 30, 2018 (six (6) pages).

German-language Search Report issued in counterpart German Application No. 10 2016 015 512.4 dated Sep. 25, 2017 with partial English translation (17 pages).

* cited by examiner

ELECTRICAL ENERGY MANAGEMENT OF A VEHICLE SYSTEM OF A MOTOR VEHICLE

BACKGROUND AND SUMMARY OF THE INVENTION

The present invention relates to electrical energy management of a vehicle system of a motor vehicle.

To minimize the energy consumption of the vehicle during the sleep mode (parked time), controllers are isolated from the power supply in this phase. As a result, each controller has to perform a cold start on wakeup, which involves all the hardware being reinitialized and the software being loaded from the NAND memory and initialized. With complex controllers that have a high proportion of software, such as with the head unit of a vehicle, it can then lake up to approximately 20-40 seconds before all functions are available to the customer. This has been customary to date in automotive electronics.

It would therefore be desirable to provide a way of speeding up the start of these vehicle functions at the beginning of vehicle use after the vehicle has been parked.

It is an aim of the invention to provide a way of avoiding or at least alleviating at least some of the disadvantages known in the prior art.

The object is achieved according to the invention by an apparatus, a method and a motor vehicle according to the claims.

The subject matter of the main claim relates in this context to an apparatus for electrical energy management of a vehicle system of a motor vehicle. The apparatus has: a power supply unit for supplying energy to the vehicle system of the motor vehicle, wherein the power supply unit has a normal mode and a standby mode; a distributor apparatus, the output side of which has voltage levels for supplying electrical energy to vehicle system components of the vehicle system of the motor vehicle, wherein the distributor apparatus is electrically connected to the power supply unit; a state monitoring apparatus, for monitoring the electrical energy supply of the power supply unit and for actuating the distributor apparatus; a computer apparatus, wherein the input side of the computer apparatus is electrically connected to the output side of the distributor apparatus, via at least one voltage level. In this case, the computer apparatus has an operating system apparatus and a volatile computer data memory. In this case, the volatile computer data memory is configured to be kept supplied with current for the energy management even in the standby mode of the apparatus such that it does not lose its vehicle system state data stored on it; and in this case the distributor apparatus is actuated by the state monitoring apparatus in the normal mode such that voltage levels for the computer apparatus and tor vehicle components of the vehicle system of the motor vehicle are provided; and the distributor apparatus is actuated by die state monitoring apparatus in the standby mode such that merely a voltage level for the volatile computer data memory of the computer apparatus is provided.

A vehicle system for the purposes of the invention means, in this context, a system in a motor vehicle that has apparatuses and systems that are electrically operated in the motor vehicle. They are normally used for the driving comfort and/or the infotainment of the vehicle user and also of further occupants. Parts of the vehicle system are ordinarily displays for the vehicle user, head unit, sound system, navigation system, head-up display, electric seat adjusting apparatuses, air conditioning system or automatic air conditioning, controllers and the like. However, this means only those apparatuses, systems and functions, that is to say components, that have no specific functions in the standby mode. One such exception is a theft warning system, for example. Specific vehicle system components of this kind are ordinarily supplied with electrical energy via a sleep mode power line, in contrast to the vehicle system components that are meant here.

The apparatus according to the invention may in this case be part of the vehicle system. However, it may also be configured as a standalone apparatus that provides the vehicle system with services as are currently usual in a head unit of a motor vehicle. However, the apparatus can also provide services that go beyond the services of a head unit.

A normal mode for the purposes of the invention means a mode of the motor vehicle in which the motor vehicle is used actively, that is to say an active mode, by virtue of the motor vehicle being in an activated state. In the normal mode, the vehicle system is normally in an active state.

A standby mode for the purposes of the invention means, in this context, a mode in which the motor vehicle is parked, that is to say a passive vehicle state. In the standby mode, the vehicle system is normally in a passive state, in particular the vehicle system is deactivated in this state, apart from vehicle system components that are necessary in the standby mode, for example, a theft warning system.

A distributor apparatus of the motor vehicle for the purposes of the invention can mean, in this context, an apparatus that performs energy distribution for the apparatus and or at least from parts of the vehicle system of the motor vehicle. Normally, it provides multiple voltage levels for vehicle system components, that is to say apparatuses/systems of the vehicle system.

A state monitoring apparatus for the purposes of the invention means, in this context, an apparatus that is responsible for detecting which state, that is to say normal mode or standby mode, the motor vehicle is in or detecting a change of state.

A computer apparatus for the purposes of the invention means, in this context, an apparatus that is configured to perform calculations that vehicle system components need in order to be able to provide their services properly. In particular, the computer apparatus can perform calculations in order to provide the vehicle user with applicable information of the vehicle system components visually.

A volatile computer data memory for the purposes of the invention means, in this context, a memory that is configured so as, in a state in which it is appropriately supplied with current, to electronically keep information in stored fashion and, in a state in which it is not supplied with current or accordingly supplied with current in unsuitable fashion, to lose this information.

The computer apparatus normally also has a CPU in this context.

The teaching according to the invention achieves the advantage that information from at least parts of the vehicle system can be kept in saved fashion, when the motor vehicle is parked, such that fresh activation of the motor vehicle results in these parts of the vehicle system being available again particularly quickly in the state that they were in before the motor vehicle was parked.

In particular, functions of vehicle components of the vehicle system can benefit from this, for example, multimedia graphics unit, microphone, iDrive, gesture camera, loudspeaker, CID combination instrument, head-up display, haptics and the like, since these components are thereby available particularly quickly after the motor vehicle returns to the normal mode.

The subject matter of one dependent claim relates in this context to a method for electrical energy management of a vehicle system of a motor vehicle. The method, in this context, involves monitoring a system state of the motor vehicle; and, if the result of the monitoring of the system state of the motor vehicle is that the motor vehicle changes from a normal mode to a standby mode, the method further involves activating a standby energy supply and deactivating a normal energy supply. In this context, the standby energy supply has merely an electrical energy supply for a computer apparatus of an apparatus according to the invention such that a volatile computer data memory of the computer apparatus, with random access, can continue, during the standby mode, to keep in stored fashion its data that are kept on it in stored fashion. In this context, the data kept on the volatile computer data memory in stored fashion have latest operating data from vehicle system components of the vehicle system of the motor vehicle: and in this context the normal energy supply involves supplying vehicle system components of the vehicle system of the motor vehicle with electrical energy. Further, the deactivating of the normal energy supply is effected such that the vehicle system components of the vehicle system of the motor vehicle are no longer supplied with electric current.

Method steps can be carried out in automated fashion in this context by a suitable automation apparatus.

According to the invention, only those components of the motor vehicle that have no specific functions in the standby mode and therefore ordinarily also do not need to be supplied with electric current in the parked vehicle state are intended to be understood as vehicle system components of the vehicle system of the motor vehicle. A theft warning system is one such special component. It is normally supplied, in the standby mode, with the electrical energy that continues to be needed via a sleep mode power line.

The teaching according to the invention achieves the advantage that when the motor vehicle is activated, after the motor vehicle has been parked, at least parts of the vehicle system are available again particularly quickly in the state that they were in before the motor vehicle was parked.

The subject matter of a further claim relates in this context to a motor vehicle. The motor vehicle has: an electrical energy supply, an apparatus according to the invention and a vehicle system, having at least one vehicle system component, in this context, the electrical energy supply is configured to supply the apparatus with a first electrical energy for a normal mode and with a second electrical energy for a standby mode. Further, the apparatus is configured so as, in the standby mode, to supply merely part of the apparatus with electrical energy and, in the normal mode, to supply the apparatus completely and the at least one vehicle system component of the vehicle system with electrical energy; and in this context the motor vehicle is configured to carry out a method according to the invention.

The electrical energy supply may be a battery, for example. Similarly, however, it is possible to provide for an active electrical energy source, for example, an electrical generator, for the normal mode and to provide for a passive energy source, for example, a battery, for the standby mode.

The teaching according to the invention achieves the advantage that when the motor vehicle is activated, after the motor vehicle has been parked, at least parts of the vehicle system are available again particularly quickly in the slate that they were in before the motor vehicle was parked.

The subject matter of a further claim relates in this context to a computer program product for an apparatus and/or a motor vehicle that is operable using a method according to the invention.

The teaching according to the invention achieves the advantage that the method can be carried out in automated fashion particularly efficiently.

The subject matter of a further claim relates in this context to a data storage medium having any computer program product according to the invention.

The teaching according to the invention achieves the advantage that the method can be distributed over or kept on the apparatuses, systems and/or motor vehicles carrying out the method particularly efficiently.

Before configurations of the invention are described in more detail below, it should first of all be stated that the invention is not restricted to the components described or the method steps described. Furthermore, the terminology used is also not a limitation, but rather has merely an exemplary character. Where the description and the claims use the singular, this also covers the plural in each case, unless the context explicitly precludes this. Any method steps can be carried out in automated fashion, unless the context explicitly precludes this. Applicable method sections can lead to corresponding apparatus properties and vice versa, which means that, unless the context explicitly precludes this, there is the possibility of a method feature changing to an apparatus feature, and vice versa.

Further exemplary configurations of the method according to the invention are explained below.

According to a first exemplary configuration, the power supply unit has a first input for a first electrical energy supply for the power supply unit for the normal mode and a second input for a second electrical energy supply for the power supply unit for the standby mode.

This configuration has the advantage that the power supply unit can be designed to be supplied with different input powers for each of the two modes. This allows, for example, electrical energy losses in the standby mode to be decreased.

According to a further exemplary configuration, the apparatus involves a current-carrying capacity of the first input of the power supply unit being substantially different than a current-carrying capacity of the second input of the power supply unit.

The current-carrying capacity of the second input may in this context be substantially lower than that of the first input of the power supply unit. The second input of the power supply unit is used in this context for supplying energy to parts of the apparatus according to the invention in the standby mode. In this state, a smaller amount of energy is accordingly needed for the energy supply. Since the voltage levels are prescribed, a lower current-carrying capacity at the second input of the power supply unit has the effect that the power supply unit can provide only a fraction of the electrical energy of the normal mode at the output, that is to say by means of the provided voltage levels.

By way of example, it may thereby be possible to provide a first electrical energy supply for the normal mode, such as an active electrical energy source, for example, an electrical generator, and to provide, for example, a passive electrical energy source for the standby mode, for example an electrical battery.

This configuration has the advantage that electrical energy losses in the standby mode can be decreased still further.

According to a further exemplary configuration, the apparatus further involves the first input of the power supply unit having a maximum current draw of between 1 A and 20 A, and the second input of the power supply unit having a maximum current draw of between 1 mA and 30 mA. Preferably, the second input has a maximum current draw of between 1 mA and 10 mA.

Since, in the standby mode, merely parts of the apparatus according to the invention can be supplied with electricity by the power supply unit and the vehicle system does not need to be supplied with electricity by the power supply unit, the power supply unit need only provide a traction of the electrical energy of the normal mode.

The low current draw and hence low power draw can allow a dedicated electrical battery to be kept that supplies the apparatus according to the invention with its available electrical energy in the standby mode. When the electrical energy of the dedicated electrical battery is exhausted, starting of the motor vehicle nevertheless continues to be possible normally.

This configuration has the advantage that the power supply unit can be choked, for the standby mode, to an output power that can be optimized for the parts of the apparatus according to the invention that are to be supplied with electrical energy.

It is advantageous that this power optimization already takes place at the input of the power supply unit. As a result, electrical energy losses in the power supply unit can be decreased further for the standby mode, which means that the standby mode can be maintained for longer, given the same total energy provided.

According to a further exemplary configuration, the apparatus further involves an electrical power draw of the apparatus in the standby mode being less than 1 W. Preferably, the electrical power draw of the apparatus in the standby mode is less than 100 mW. Particularly preferably, the electrical power draw of the apparatus in the standby mode is less than 20 mW.

This configuration has the advantage that the standby mode can be maintained for even longer, given the same total energy provided.

Further, this configuration has the advantage that the apparatus according to the invention can be supplied with the required electrical energy in the standby mode via an electrical terminal or line that is already present in the motor vehicle, as are already used for a theft warning system and similar components that are active in the standby mode, for example. This sleep mode power line normally has a maximum current-carrying capacity of approximately 20 mA.

According to a further exemplary configuration, the apparatus further involves a respective necessary power consumption of the volatile computer data memory in order to be able to continue to keep its vehicle system state data that are stored on it being dependent on a respective refresh cycle time of the volatile computer data memory.

In this case, a dependency of the power consumption of the volatile computer data memory on the ambient temperature thereof may be lodged in the apparatus. Preferably, the dependency of the power consumption of the volatile computer data memory on the ambient temperature thereof may be lodged in the state monitoring apparatus.

In the latter case, for example, if there is provision for a dedicated electrical battery in order to provide the electrical energy for the standby mode, it is possible to provide for a different magnitude of energy capacity for the dedicated electrical battery depending on the usual ambient temperature of the country in which the motor vehicle is delivered.

This configuration has the advantage that the standby mode can be maintained for longer, given the same total energy provided, depending on the temperature in the motor vehicle.

According to a further exemplary configuration, the apparatus further involves the volatile computer data memory being configured to control its refresh cycle times independently.

Since the power consumption of the volatile computer data memory is normally dependent on the temperature thereof, the result is that the refresh cycle time is likewise dependent on the temperature.

In the automotive sector, components are used whose basic requirements are often in the temperature range from −40° C. to +90° C. It is not uncommon for −40° C. to +125° C. to be required for semiconductor devices for the continuous operating temperature ranges thereof.

Normally, the power consumption of volatile computer data memories rises sharply above temperatures upward of approximately +70° C., so that the refresh cycle time speeds up accordingly, and the power consumption of the volatile computer data memories decreases sharply below +10° C., which means that the refresh cycle time is slowed down accordingly.

So that the volatile computer data memory can control its refresh cycle times itself, it can have a temperature sensor of its own.

In order to be able to monitor the energy budget of the state monitoring apparatus better, a temperature-dependent refresh cycle time table of the volatile computer data memory may be lodged in the stale monitoring apparatus.

This configuration has the advantage that a refresh cycle time that needs to be prescribed externally can be avoided, which means that the apparatus according to the invention can be produced less expensively, since electrical assemblies can be dispensed with.

A further advantage is that it is possible to prevent an erroneous refresh cycle time from being transmitted. It is thus possible to prevent the consistency of the kept data in the computer data memory from being endangered by an erroneous refresh cycle time.

According to a further exemplary configuration, the apparatus further has a holding apparatus configured so as, in the event of a change of the energy supply of the power supply unit from one of the two inputs of the power supply unit to the other of the two inputs of the power supply unit, to ensure a power supply for the volatile computer data memory without interruption.

This configuration has the advantage that it is possible to ensure that changeover of the external energy supply for the power supply unit can be performed safely without data losses in the volatile computer data memory.

According to a first exemplary configuration, the method further involves, if the result of the monitoring of the system state of the motor vehicle is that the motor vehicle changes from the standby mode to the normal mode: activating the normal energy supply, deactivating the standby energy supply and activating the applicable vehicle system components of the vehicle system of the motor vehicle. This is effected such that these applicable vehicle system components are available, immediately after the change of the motor vehicle to the normal mode, for a use that corresponds to a state of the applicable vehicle system components that said vehicle system components had before the motor vehicle previously changed from the normal state to the standby state, based on the data that are kept on the volatile computer data memory.

This configuration has the advantage that it is possible to safely bring about again that state that at least parts of the vehicle system were in before the change from the normal mode to the standby mode was made.

A further advantage is that this state is able to be safely brought about again extremely quickly.

According to a further exemplary configuration, the method further involves the standby mode being indicative of a switched-off state of the motor vehicle.

This configuration has the advantage that the applicable vehicle system state data can be kept in saved fashion for extremely fast availability even when the motor vehicle has been standing for longer.

According to a further exemplary configuration, the method involves the standby mode being able to be electrically maintained for at least 10 h. Preferably, the standby mode can be electrically maintained for at least 40 h. Particularly preferably, the standby mode can be electrically maintained for at least 50 h.

This configuration has the advantage that the applicable vehicle system state data can be kept in saved fashion for extremely fast availability even when the motor vehicle has been standing for a time equivalent to approximately one full working day of the motor vehicle user.

In the particularly preferred case, this configuration has the advantage that the applicable vehicle system state data can be kept in saved fashion for extremely fast availability even when the motor vehicle has been standing for a time equivalent to approximately a weekend. This can be advantageous particularly for working people who use their motor vehicle only for commuting and therefore do not use it at the weekend.

According to a first exemplary configuration, the motor vehicle further involves the standby mode in a switched-off state of the motor vehicle being able to be electrically maintained for at least 10 h. Preferably, the standby mode can be electrically maintained for at least 40 h. Particularly preferably, the standby mode can be electrically maintained for at least 80 h.

By way of example, a particular limited amount of energy can be provided by the motor vehicle or by the electrical energy store thereof. When this amount of energy is exhausted, the apparatus can be completely de-energized, so that no further energy consumption arises. As a result, it is possible to prevent the electrical energy store of the motor vehicle from being exhausted.

This configuration has the advantage that the saved keeping of the information such that the associated parts of the vehicle system of the motor vehicle are available again particularly quickly, after the motor vehicle is activated, in the previous state, at the time at which the motor vehicle was parked, is limited only by the energy provided by the motor vehicle.

To date, it has been necessary, after the motor vehicle has been parked or switched off, to perform a cold start of the computer apparatus and hence of the vehicle system when the motor vehicle is used again. This normally involves approximately 1 GB to 1.5 GB of executable code being loaded into the volatile computer data memory. It is then first possible to initialize the software, such as, for example, the operating system of a system on a chip (SoC) apparatus as operating system apparatus. Only then can the system statuses of vehicle system components of the vehicle system be generated, obtained and conditioned. As a result, it takes up to approximately 40 seconds before all functions of the vehicle system are available in the motor vehicle.

This cannot be avoided in the automotive sector, however, by switching to nonvolatile computer data memories in order to be able to keep the system statuses, that is to say the vehicle system state data, in stored fashion in the fast memory even in the switched-off vehicle state. The reason is that these nonvolatile computer data memories are too expensive in comparison with volatile computer data memories. Further, such high capacities are normally not available for the automotive sector, since the automotive sector requires specific suitabilities or certifications. These suitabilities in terms of temperature resistance and quality requirements are not available and/or too expensive in the case of fast nonvolatile computer data memories, normally based on NAND technology, also called "flash memories".

Keeping the data in volatile computer date memories has likewise not been possible to date, since said memories were not able to be kept supplied with current in the switched-off motor vehicle. In the case of computer data memories hitherto customary for the automotive sector, the memory controlling of the volatile computer data memory was performed by an interfaced CPU. Therefore, the whole computer apparatus would need to continue to be supplied with electrical energy in the switched-off or parked motor vehicle mode, which means that the energy consumption would be too high to be able to allow sensible standing times for the motor vehicle after which a fast start for the vehicle systems would still be possible.

The invention permits vehicle system state data to be kept in a volatile computer data memory even after the motor vehicle is parked, permits said memory to continue to be kept supplied with current in the parked state of the motor vehicle and hence permits these vehicle system state data to be made available to the applicable vehicle system components again extremely quickly when the motor vehicle is used again, so that said vehicle system components can assume the last system state again and do not need to be restarted. This allows the time from renewed start of use of the motor vehicle to availability of the last vehicle system states to be shortened from approximately up to 40 seconds to approximately 2 to 3 seconds. In this case, the energy required in the parked state of the motor vehicle is only a traction of the energy required during vehicle operation.

As a result, these vehicle system state data are able to be kept in stored fashion in the volatile computer data memory in a parked motor vehicle state for a significantly long time. The volatile computer data memory can be maintained by the vehicle energy system of the motor vehicle for approximately 400 mAh, which can correspond to a parked time of up to 80 h for the motor vehicle.

Since there is already a sleep mode in the motor vehicle in the parked state, for existing apparatuses/systems that are supposed to continue to be kept supplied with current so as to be available with low energy expenditure (no more than approximately 20 mA current-carrying capacity), such as a theft warning system, the apparatus according to the invention can likewise be kept supplied with current by this sleep mode terminal or power line in the standby mode according to one configuration of the invention, which can reduce production costs for the motor vehicle. However, this requires changeover from a normal energy supply terminal of the vehicle system to the standby energy supply terminal for me apparatus according to the invention or for the volatile computer data memory. This can be effected in the power supply unit of the apparatus according to the invention, for example.

In order to prevent a brief interruption to the supply of energy to the volatile computer data memory in this case, it is possible to provide for a holding circuit that continues to supply the volatile computer data memory with the required electrical energy at the changeover instant and until transient processes are complete.

The distributor apparatus normally keeps multiple voltage levels, for example, 1V, 3V, 7V and the like, as are needed by vehicle system components. The apparatus according to the invention can likewise use these voltage levels. If a voltage or voltage level for the volatile computer data memory is not provided by the distributor apparatus, the computer apparatus can convert an available voltage level to the voltage level needed by the volatile computer data memory, for example.

Further, persistent data of the vehicle system components can be stored in the standby mode in order to protect them, as is currently likewise effected when the vehicle system is powered down.

If a temperature-dependent refresh cycle time table of the volatile computer data memory is lodged in the state monitoring apparatus, it is also possible for the state monitoring apparatus, in addition to the volatile computer data memory, to be kept supplied with current in the standby mode such that it can provide the volatile computer data memory with required data from the refresh cycle time table. This can be effected such that it does not significantly increase the electrical energy consumption in the standby mode, however.

The apparatus according to the invention may be interfaced or integrated to or in the vehicle system as a stand-alone part. The apparatus according to the invention may also be part of the head unit.

Since, in the standby mode or sleep mode, only those vehicle system components that have a function are kept supplied with current and the head unit itself has no function in the standby mode, it would also be necessary in this case for only the apparatus according to the invention or the volatile computer data memory thereof and possibly parts of the state monitoring apparatus to be kept supplied with current.

The invention allows optimum use of the battery capacity of the motor vehicle and hence allows $CO_2$ to be saved, since the vehicle battery used in this regard therefore needs to be charged less by an internal combustion engine or by conventionally generated electrical energy. Further, this also allows a lower battery capacity to be provided for, allowing production costs and $CO_2$ emitted during battery production to be saved.

The invention will be explained in more detail below using the figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
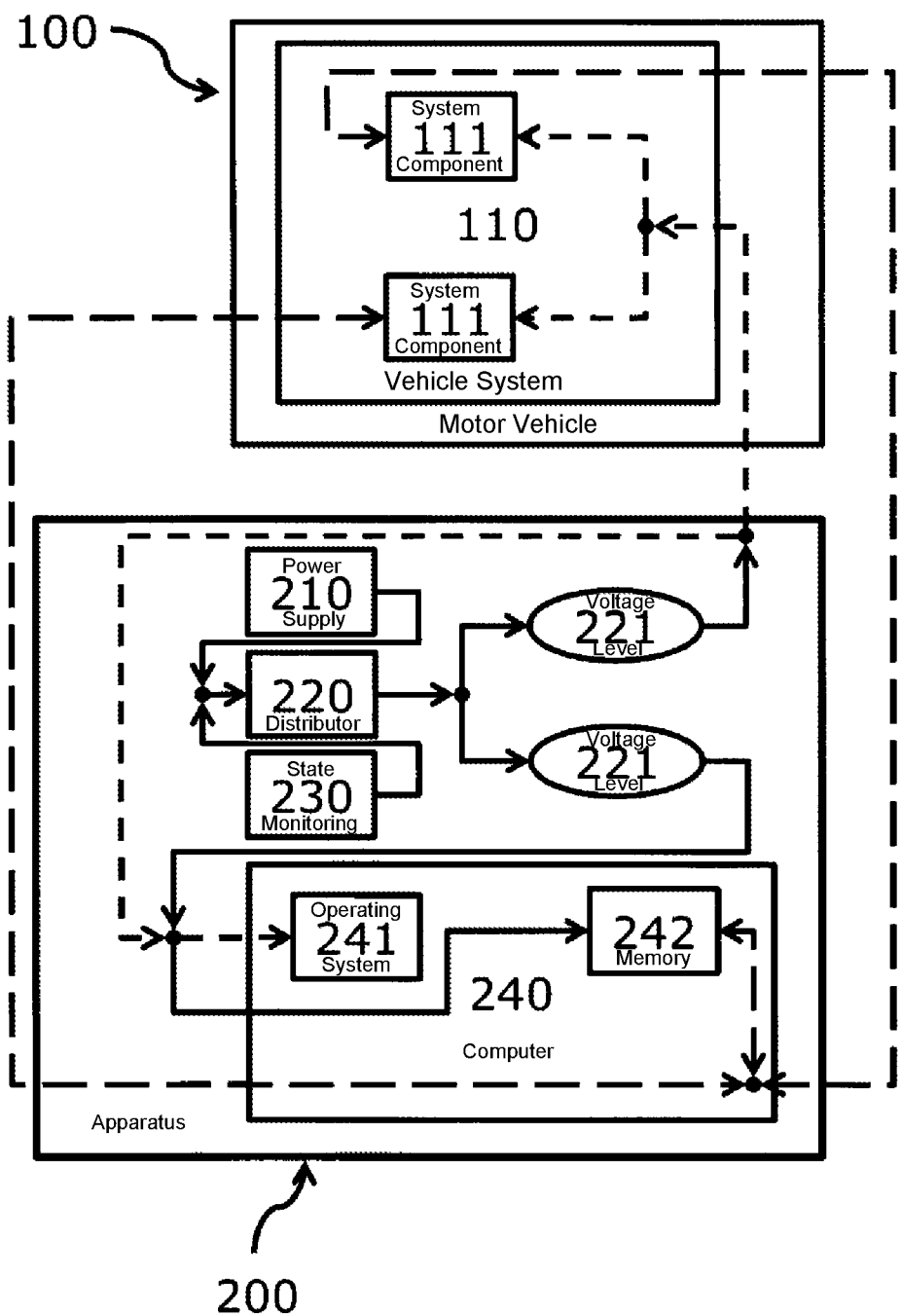
FIG. 1 shows a schematic depiction of a proposed apparatus according to an exemplary configuration of the invention.

FIG. 1 shows a schematic depiction of a proposed apparatus according to an exemplary configuration of the invention.

In this case, FIG. 1 shows a schematic depiction of an apparatus 200 for electrical energy management of a vehicle system 110 of a motor vehicle 100. The apparatus 200 in this case has a power supply unit 210 for the energy supply of the vehicle system 110 of the motor vehicle 100. In this case, the power supply unit 210 has a normal mode and a standby mode. Further, the apparatus 200 has a distributor apparatus 220, the output side of which has voltage levels 221 for the electrical energy supply of vehicle system components 111 of the vehicle system 110 of the motor vehicle 100. In this case, the distributor apparatus 220 is electrically connected to the power supply unit 210. Further, the apparatus 200 has a state monitoring apparatus 230, for monitoring the electrical energy supply of the power supply unit 210 and for actuating the distributor apparatus 220; and beyond that the apparatus 200 further has a computer apparatus 240. In this case, the input side of the computer apparatus 240 is electrically connected to the output side of the distributor apparatus 220, via at least one voltage level 221. Further, the computer apparatus 240 has an operating system apparatus 241 and a volatile computer data memory 242; and in this case the volatile computer data memory 242 is configured to be kept supplied with current for the energy management even in the standby mode of the apparatus 200 such that it does not lose its data stored on it. The distributor apparatus 220 is actuated by the state monitoring apparatus 230 in the normal mode such that voltage levels 221 for the computer apparatus 240 and for vehicle components 111 of the vehicle system 110 of the motor vehicle 100 are provided; and former, the distributor apparatus 220 is actuated by the state monitoring apparatus 230 in the standby mode such that merely a voltage level 221 for the volatile computer data memory 242 of the computer apparatus 240 is provided.

The interchange of data between the vehicle system components 111 and the volatile computer data memory 242 are depicted by double-headed arrows in order to clarity that data can be transmitted both from the vehicle system components 111 to the volatile computer data memory 242 and vice versa.

A dashed arrow depiction in this case depicts the data communication and the supply of current in the normal mode, whereas a solid arrow depiction depicts the supply of current in the standby mode, in which no data communication can take place between vehicle system components 111 and volatile computer data memory 242. In this case, the electrical energy supply of the volatile computer data memory 242 of the computer apparatus 240, which is effected in the standby mode by the lower of the two voltage levels 221 depicted in FIG. 1, can also continue to be active in the normal mode, so that in the normal mode the computer apparatus can be supplied with electrical energy via multiple voltage levels 221. In the standby mode, the volatile computer data memory 242 remains supplied with current, however, and can therefore keep its vehicle system data that are filed in it in stored fashion.

Figure 2:
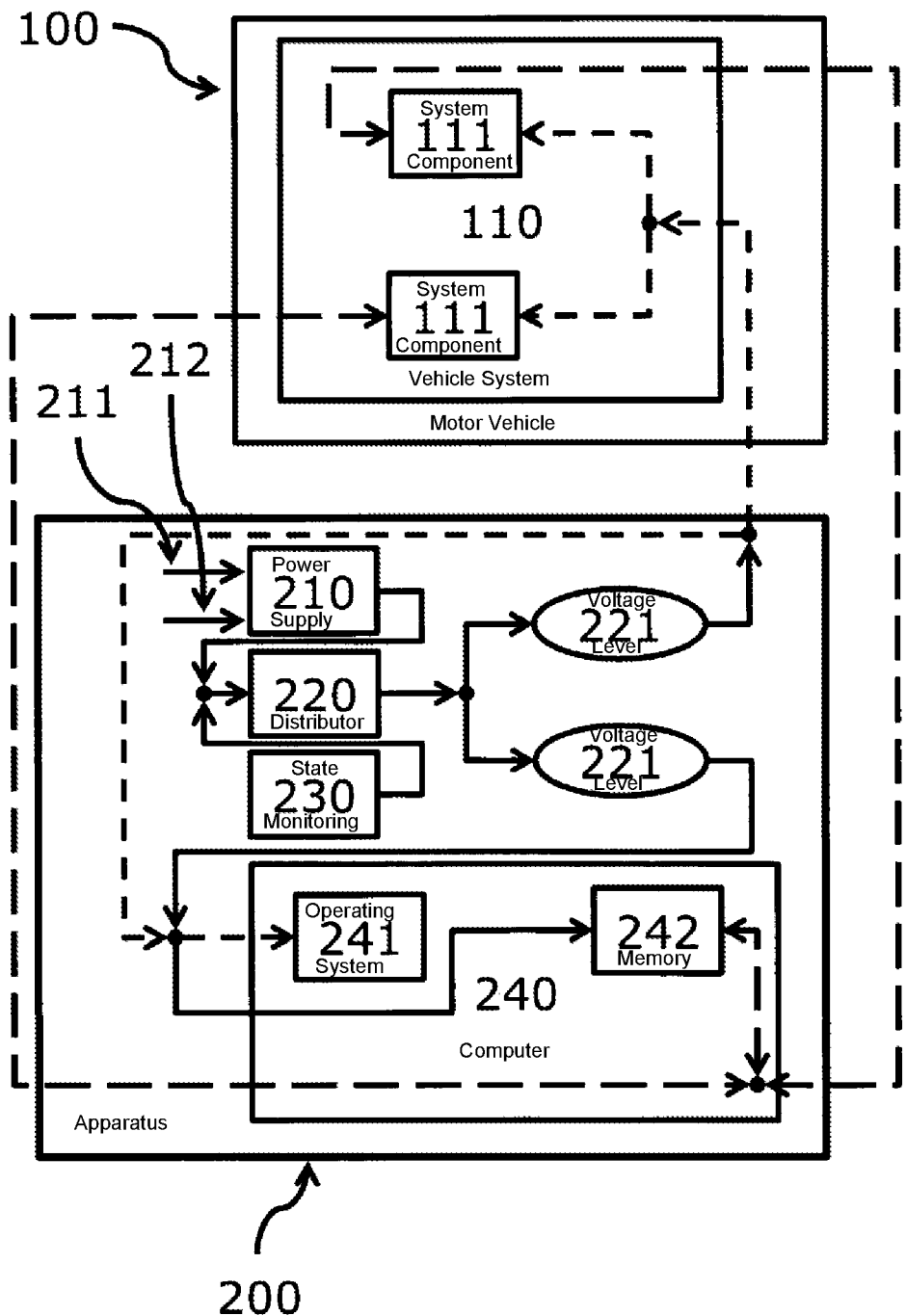
FIG. 2 shows a schematic depiction of a proposed apparatus according to a further exemplary configuration of the invention.

FIG. 2 shows a schematic depiction of a proposed apparatus according to a further exemplary configuration of the invention.

In this case, FIG. 2 shows a schematic depiction of an apparatus developed further in relation to FIG. 1. The same statements as above for FIG. 1 therefore also continue to apply for FIG. 2.

FIG. 2 shows the apparatus from FIG. 1, in the case of which the power supply unit 210 further has a first input 211 for a first electrical energy supply for the power supply unit 210 for the normal mode and a second input 212 for a second electrical energy supply for the power supply unit 210 for the standby mode.

Figure 3:
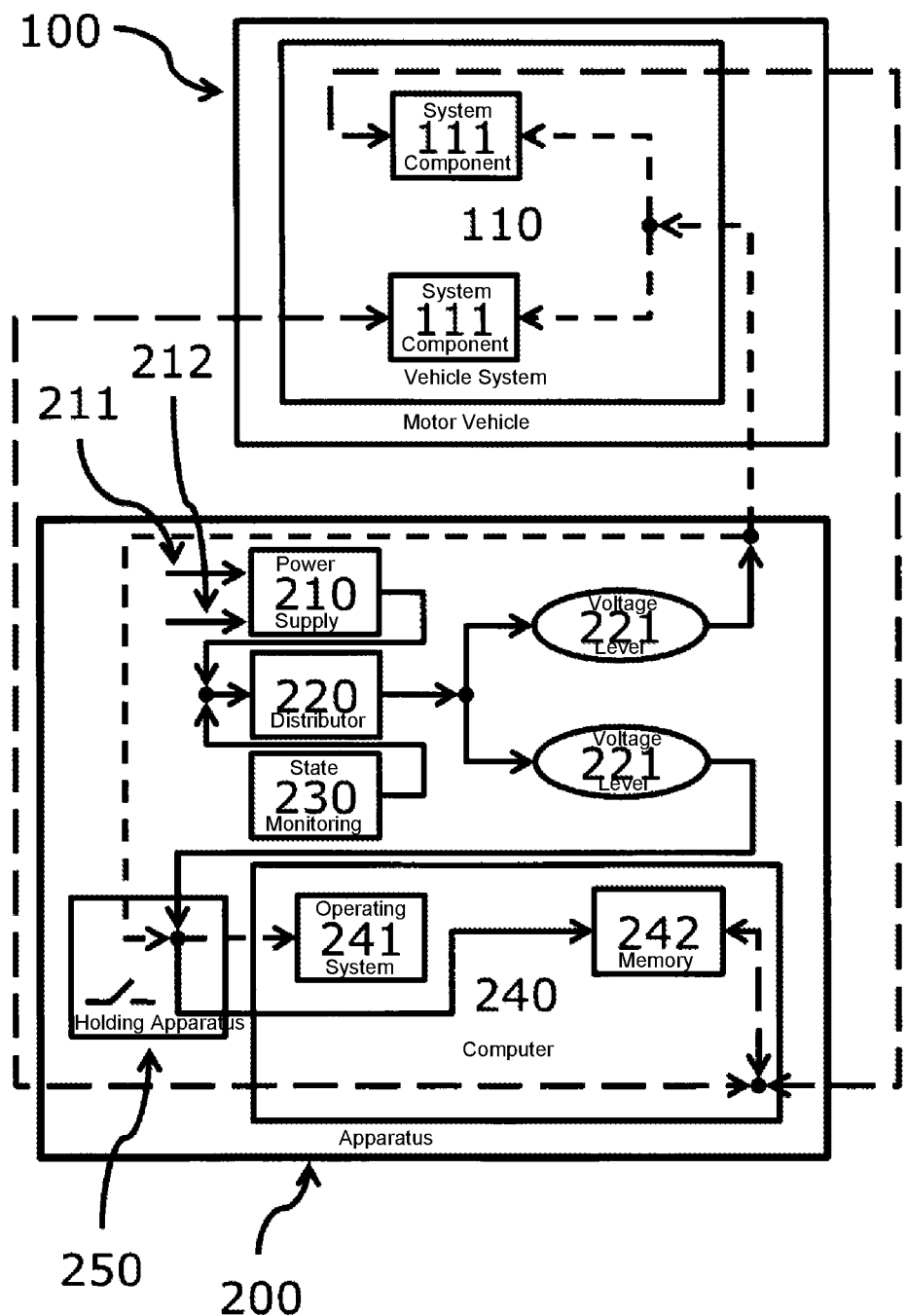
FIG. 3 shows a schematic depiction of a proposed apparatus according to a farther exemplary configuration of the invention.

FIG. 3 shows a schematic depiction of a proposed apparatus according to a further exemplary configuration of the invention.

In this case, FIG. 3 shows a schematic depiction of an apparatus that is developed further in relation to FIG. 1 and FIG. 2. The statements that are made above for FIG. 1 and FIG. 2 therefore also continue to apply for FIG. 3.

FIG. 3 shows the apparatus from FIG. 2, in the case of which the apparatus further has a holding apparatus 250. This is configured so as, in the event of a change of the energy supply of the power supply unit 210 from one of the two inputs 211, 212 of the power supply unit 210 to the other input 212, 211 of the power supply unit 210, to ensure a power supply for the volatile computer data memory 242 without interruption.

Figure 4:
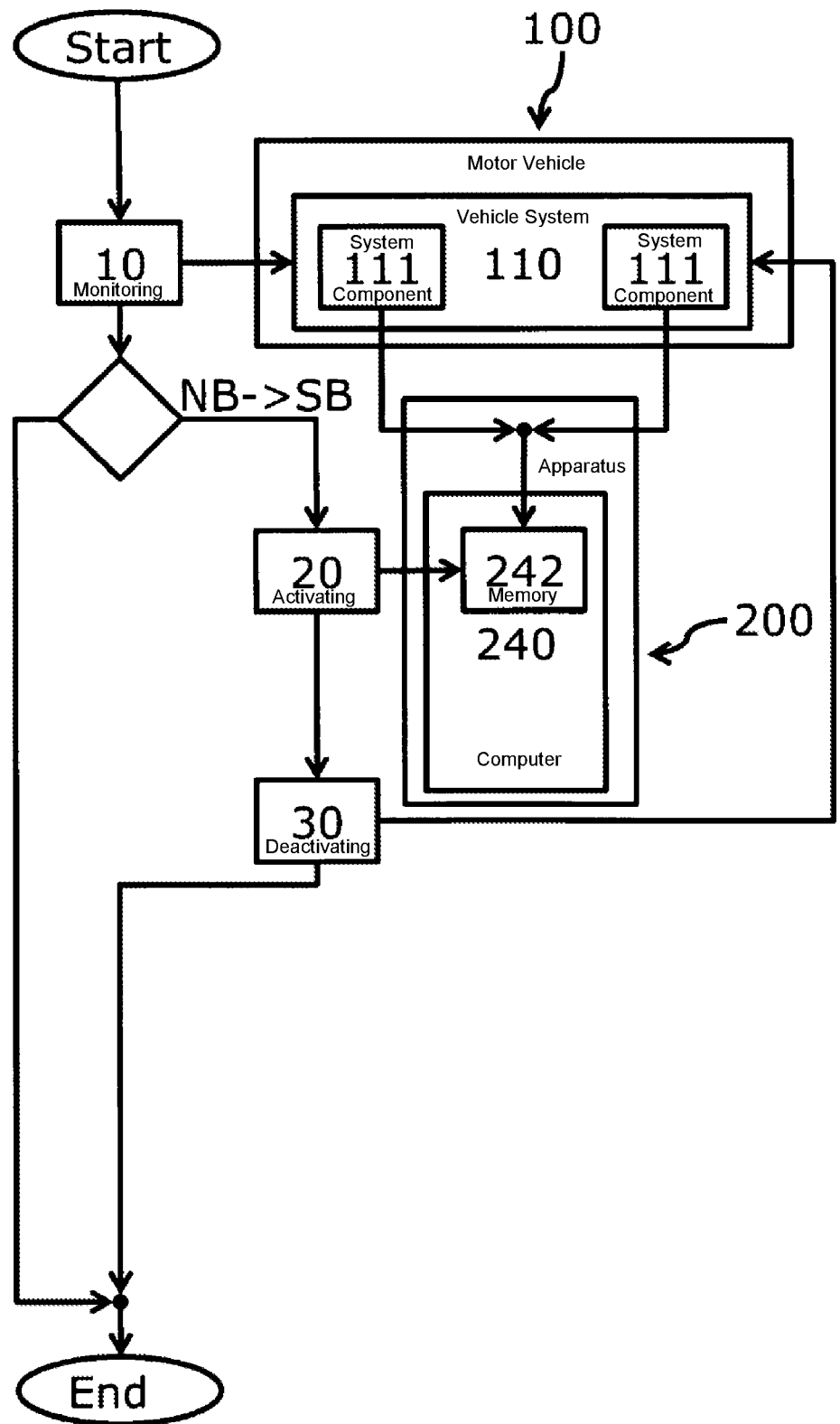
FIG. 4 shows a schematic depiction of a proposed method according to a further exemplary configuration of the invention.

FIG. 4 shows a schematic depiction of a proposed method according to a further exemplary configuration of the invention.

FIG. 4 shows a method in which the method for electrical energy management of a vehicle system 110 of a motor vehicle 100 involves: monitoring 10 a system state of the motor vehicle 100, and if the result of the monitoring 10 of the system state of the motor vehicle 100 is that the motor vehicle 100 changes from a normal mode to a standby mode NB→SB, the method further involves: activating 20 a standby energy supply and deactivating 30 a normal energy supply. In this case, standby energy supply has merely an electrical energy supply for a computer apparatus 240 of an apparatus 200 according to the invention such that a volatile computer data memory 242 of the computer apparatus 240, with random access, can continue, during the standby mode, to keep in stored fashion its data that are kept on it in stored fashion; and in this case the data kept on the volatile computer data memory 242 in stored fashion have latest operating data from vehicle system components 111 of the vehicle system 110 of the motor vehicle 100. Further, the normal energy supply involves supplying vehicle system components 111 of the vehicle system 110 of the motor vehicle 100 with electrical energy; and in this case the deactivating 30 of the normal energy supply is effected such that the vehicle system components 111 of the vehicle system 110 of the motor vehicle 100 are no longer supplied with electrical current by the normal energy supply.

Figure 5:
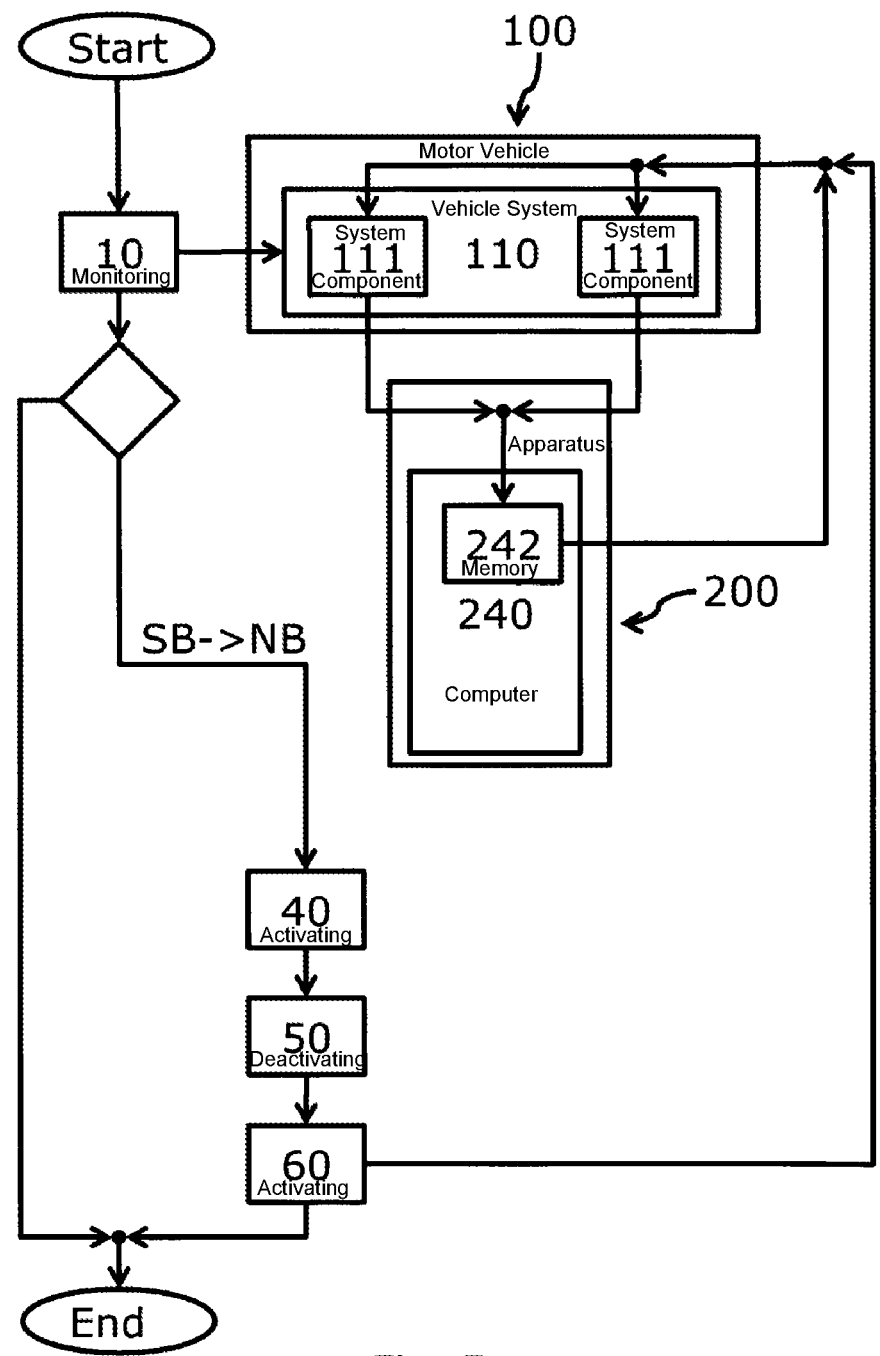
FIG. 5 shows a schematic depiction of a proposed method according to a further exemplary configuration of the invention.

FIG. 5 shows a schematic depiction of a proposed method according to a former exemplary configuration of the invention.

In this case, FIG. 5 shows a schematic depiction of a method that is developed further in relation to FIG. 4. The statements made above for FIG. 4 therefore also continue to apply for FIG. 5. For reasons of clarity, the method sequence for the case in which the motor vehicle 100 changes from the normal mode to the standby mode NB→SB is not depicted in FIG. 4.

FIG. 5 shows the method from FIG. 4, in the case of which the method further involves: if the result of the monitoring 10 of the system state of the motor vehicle 100 is that the motor vehicle 100 changes from the standby mode to the normal mode SB→NB: activating 40 the normal energy supply, deactivating 50 the standby energy supply and activating 60 the applicable vehicle system components 111 of the vehicle system 110 of the motor vehicle 100. The latter is effected such that these applicable vehicle system components 111 are available, immediately after the change of the motor vehicle 100 to the normal mode, for a use that corresponds to a state of the applicable vehicle system components 111 that said vehicle system components had before the motor vehicle 100 previously changed from the normal mode to the standby mode NB→SB, based on the data that are kept on the volatile computer data memory 242.

Figure 6:
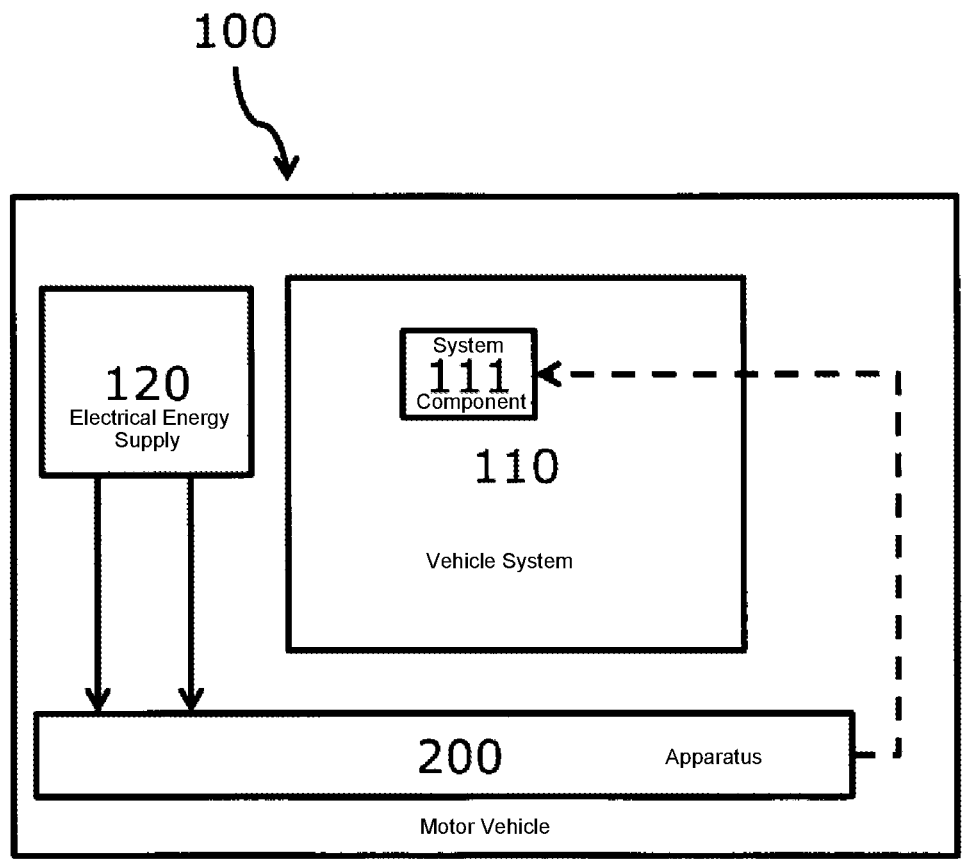
FIG. 6 shows a schematic depiction of a proposed motor vehicle according to a further exemplary configuration of the invention.

FIG. 6 shows a schematic depiction of a proposed motor vehicle according to a further exemplary configuration of the invention.

In this case, FIG. 6 shows a schematic depiction of a motor vehicle 100 having: an electrical energy supply 120, a vehicle system 110, having at least one vehicle system component 111, and an apparatus 200 according to the invention. In this case, the electrical energy supply 120 is configured to supply the apparatus 200 according to the invention with a first electrical energy for a normal mode and with a second electrical energy for a standby mode. Further, the apparatus 200 according to the invention is configured so as, in the standby mode, to supply merely part of the apparatus 200 according to the invention with electrical energy and, in the normal mode, to supply the apparatus 200 according to the invention completely and the at least one vehicle system component 111 of the vehicle system 110 with electrical energy; and in this case the motor vehicle 100 and/or the apparatus 200 according to the invention are configured to carry out a method according to the invention.

The invention can be summarized in this case as follows:

The primary aim of the invention is to significantly shorten the startup time of the media graphics unit (MGU) or the head unit. At present, this is in a range around from 20 s to 40 s. Using what is known as an instant-on functionality, the startup can be reduced to from 2 to 3 s.

In essence, this is made possible by the new DRAM technology LP-DDR4, since in that case the main memory retains its content with a very low expenditure of energy (refresh current) and in so doing controls the refresh rate or its refresh cycle time itself. This previously required an external controller.

To this end, an electrical holding circuit for the LP-DDR4 can be implemented in the MGU. In the normal mode of the MGU, all of the internal components, such as a main processor, Ethernet switch, CAN receiver, APIX transmitter, drives and the like, can be powered via a first terminal. In the "instant-on" mode, on the other hand, the holding current can be supplied via a second terminal, which provides a low electrical power than the first terminal. The electrical holding circuit dispenses with the software loading and initialization on startup.

From what is known as the "wakeup event" onward, it is then possible to change over to the first terminal again and the system starts at the point that it was at before the "sleep mode."

In order to be able to ensure the ability of the motor vehicle to start even when it is parked for longer, the "instant-on mode" switches off after approximately 80 h. On the next wakeup, the device performs a cold start in that case, as has always been the case to date.

The wakeup process can be controlled in this case by a state machine that, on every wakeup, decides the mode in which booting takes place, and can accordingly initiate different start sequences. To this end, drives in the operating system, in the board support package and in the applications need to be extended and adapted as appropriate.

LIST OF REFERENCE SIGNS

10 Monitoring a system state of the motor vehicle
20 Activating a standby energy supply
30 Deactivating a normal energy supply
40 Activating the normal energy supply
50 Deactivating the standby energy supply
60 Activating the applicable vehicle system components
100 Motor vehicle
110 Vehicle system
111 Vehicle component
120 Electrical energy supply
200 Apparatus for electrical energy management of a vehicle system of a motor vehicle
210 Power supply unit
211 First input
212 Second input
220 Distributor apparatus
221 Voltage level
230 State monitoring apparatus
240 Computer apparatus
241 Operating system apparatus
242 Volatile computer data memory
NB→SB Change from the normal mode to the standby mode
SB→NB Change from the standby mode to the normal mode The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for electrical energy management of a vehicle system of a motor vehicle, the apparatus comprising:
a power supply unit configured to supply energy to the vehicle system of the motor vehicle, wherein the power supply unit has a normal mode as a first operating state and a standby mode as a second operating state;
a distributor apparatus, an output side of which has voltage levels for supplying electrical energy to vehicle system components of the vehicle system of the motor vehicle, wherein the distributor apparatus is electrically connected to the power supply unit;
a state monitoring apparatus configured to monitor the operating state of the power supply unit and to actuate the distributor apparatus;
a computer apparatus, wherein an input side of the computer apparatus is electrically connected to the output side of the distributor apparatus, via at least one voltage level;
the computer apparatus has an operating system apparatus and a volatile computer data memory, wherein the volatile computer data memory is configured to keep vehicle system state data from vehicle system components of the vehicle system of the motor vehicle in stored fashion, and wherein
the distributor apparatus is actuated by the state monitoring apparatus in the normal mode such that voltage levels for the computer apparatus and for vehicle system components of the vehicle system of the motor vehicle are provided,
the distributor apparatus is actuated by the state monitoring apparatus in the standby mode such that merely a voltage level for the volatile computer data memory of the computer apparatus is provided, and wherein
the volatile computer data memory is configured to be kept supplied with current even in the standby mode such that the volatile computer data memory does not lose the vehicle system state data stored therein.

2. The apparatus according to claim 1, wherein the power supply unit comprises:
a first input for a first electrical energy supply for the power supply unit for the normal mode; and
a second input for a second electrical energy supply for the power supply unit for the standby mode.

3. The apparatus according to claim 2, wherein a current-carrying capacity of the first input of the power supply unit is substantially different than a current-carrying capacity of the second input of the power supply unit.

4. The apparatus according to claim 2, wherein the first input of the power supply unit has a maximum current draw of between 1 A and 20 A, and the second input of the power supply unit has a maximum current draw of between 1 mA and 30 mA.

5. The apparatus according to claim 4, wherein the second input of the power supply unit has a maximum current draw of between 1 mA and 10 mA.

6. The apparatus according to claim 1, wherein an electrical power draw of the apparatus in the standby mode is less than 1 W.

7. The apparatus according to claim 6, wherein the electrical power draw of the apparatus in the standby mode is less than 100 mW.

8. The apparatus according to claim 1, wherein a respective necessary power consumption of the volatile computer data memory in order to be able to continue to keep the vehicle system state data that are stored therein is dependent on a respective refresh cycle time of the volatile computer data memory.

9. The apparatus according to claim 1, wherein the volatile computer data memory is configured to control refresh cycle times independently.

10. The apparatus according to claim 1, further comprising:
a holding apparatus configured so as, in an event of a change of the electrical energy supply of the power supply unit from a first of two inputs of the power supply unit to a second of the two inputs of the power supply unit, to ensure a power supply for the volatile computer data memory without an energy interruption.

11. A method for electrical energy management of a vehicle system of a motor vehicle, the method comprising:
monitoring a system state of the motor vehicle, and, in a case in which a result of the monitoring of the system state of the motor vehicle is that the motor vehicle changes from a normal mode to a standby mode:
activating a standby energy supply, wherein the standby energy supply has merely an electrical energy supply for a computer apparatus of an apparatus for electrical energy management of the vehicle system of the motor vehicle such that a volatile computer data memory of the computer apparatus, with random access, can continue, during the standby mode, to keep in stored fashion data that are stored on the volatile computer data memory, and wherein the data stored on the volatile computer data memory have latest operating data from vehicle system components of the vehicle system of the motor vehicle, and deactivating a normal energy supply, wherein the normal energy supply involves supplying vehicle system components of the vehicle system of the motor vehicle with electrical energy, wherein the deactivating of the normal energy supply is effected such that the vehicle system components of the vehicle system of the motor vehicle are no longer supplied with electric current.

12. The method according to claim 11, further comprising:

in a case in which the result of the monitoring of the system state of the motor vehicle is that the motor vehicle changes from the standby mode to the normal mode:

activating the normal energy supply;

deactivating the standby energy supply; and activating applicable vehicle system components of the vehicle system of the motor vehicle such that the applicable vehicle system components are available, immediately after the change of the motor vehicle to the normal mode, for a use that corresponds to a state of the applicable vehicle system components that the vehicle system components had before the motor vehicle previously changed from the normal state to the standby state, based on the data that are stored on the volatile computer data memory.

13. The method according to claim 11, wherein the standby mode is indicative of a switched-off state of the motor vehicle.

14. The method according to claim 11, wherein the standby mode can be electrically maintained for at least 10 hours.

15. The method according to claim 14, wherein the standby mode can be electrically maintained for at least 40 hours.

16. A motor vehicle comprising:

an electrical energy supply;

a vehicle system having at least one vehicle system component; and an apparatus for electrical energy management of the vehicle system of a motor vehicle, wherein the electrical energy supply is configured to supply the apparatus with a first electrical energy for a normal mode and with a second electrical energy for a standby mode, the apparatus is configured so as, in the standby mode, to supply merely part of the apparatus with electrical energy, and, in the normal mode, to supply the apparatus completely and the at least one vehicle system component of the vehicle system with electrical energy.

17. The motor vehicle according to claim 16, wherein in a switched-off state of the motor vehicle the standby mode can be electrically maintained for at least 10 hours.

18. The motor vehicle according to claim 17, wherein in the switched-off state of the motor vehicle the standby mode can be electrically maintained for at least 40 hours.

19. A non-transitory data storage medium storing a computer program that executes a method for electrical energy management of a vehicle system of a motor vehicle, the method comprising:

monitoring a system state of the motor vehicle, and, in a case in which a result of the monitoring of the system state of the motor vehicle is that the motor vehicle changes from a normal mode to a standby mode:

activating a standby energy supply, wherein the standby energy supply has merely an electrical energy supply for a computer apparatus of an apparatus for electrical energy management of the vehicle system of the motor vehicle such that a volatile computer data memory of the computer apparatus, with random access, can continue, during the standby mode, to keep in stored fashion data that are stored on the volatile computer data memory, and wherein the data stored on the volatile computer data memory have latest operating data from vehicle system components of the vehicle system of the motor vehicle, and deactivating a normal energy supply, wherein the normal energy supply involves supplying vehicle system components of the vehicle system of the motor vehicle with electrical energy, wherein the deactivating of the normal energy supply is effected such that the vehicle system components of the vehicle system of the motor vehicle are no longer supplied with electric current.

* * * * *